United States Patent
Lu et al.

(10) Patent No.: US 9,360,964 B2
(45) Date of Patent: Jun. 7, 2016

(54) OPTICAL TOUCH APPARATUS USING A DYNAMIC THRESHOLD FOR SENSING A TOUCH DEVICE AND OPTICAL TOUCH METHOD

(71) Applicant: Wistron Corporation, New Taipei (TW)

(72) Inventors: Kuo-Hsien Lu, New Taipei (TW); Ching-An Cho, New Taipei (TW); Yu-Yen Chen, New Taipei (TW); Chia-Ta Hsieh, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 83 days.

(21) Appl. No.: 14/548,321

(22) Filed: Nov. 20, 2014

(65) Prior Publication Data

US 2015/0309647 A1 Oct. 29, 2015

(30) Foreign Application Priority Data

Apr. 23, 2014 (TW) .............................. 103114677 A (51) Int. Cl.
*G06F 3/041* (2006.01)
*G06F 3/042* (2006.01)

(52) U.S. Cl.
CPC ............ *G06F 3/0416* (2013.01); *G06F 3/0428* (2013.01)

(58) Field of Classification Search
None
See application file for complete search history.

(56) References Cited

U.S. PATENT DOCUMENTS

| | | | | |
|---|---|---|---|---|
| 2006/0232792 A1* | 10/2006 | Kobayashi | ............ | G06F 3/0421 356/621 |
| 2009/0044989 A1* | 2/2009 | Sato | ...................... | G06F 3/0421 178/18.01 |
| 2012/0002217 A1* | 1/2012 | Kobayashi | ............ | G06F 3/0428 356/622 |
| 2012/0176304 A1* | 7/2012 | Mizuno | ................... | G06F 3/042 345/156 |
| 2013/0162601 A1 | 6/2013 | Su et al. | | |
| 2015/0002425 A1* | 1/2015 | Lee | ........................ | G06F 3/0416 345/173 |
| 2015/0145832 A1* | 5/2015 | Lin | ....................... | G06F 3/0428 345/175 |

FOREIGN PATENT DOCUMENTS

TW 201327322 A 7/2013

OTHER PUBLICATIONS

TW Office Action dated Jun. 12, 2015 in corresponding Taiwan application (No. 103114677).
Partial English translation of TW Office Action dated Jun. 12, 2015 in corresponding Taiwan application (No. 103114677).

* cited by examiner

*Primary Examiner* — Ryan A Lubit
(74) *Attorney, Agent, or Firm* — McClure, Qualey & Rodack, LLP (57) ABSTRACT

An optical touch apparatus and an optical touch method are disclosed. The optical touch apparatus comprises a touch panel, a first optical sensor, a second optical sensor and a processor. The first optical sensor senses a light pen to output a first sensing signal. The second optical sensor senses the light pen to output a second sensing signal. The processor decides a threshold value according to the second sensing signal, and determines whether the first sensing signal is greater than the threshold value. The processor determines that the light pen touches the touch panel if the first sensing signal is greater than the threshold value.

19 Claims, 10 Drawing Sheets

OPTICAL TOUCH APPARATUS USING A DYNAMIC THRESHOLD FOR SENSING A TOUCH DEVICE AND OPTICAL TOUCH METHOD

This application claims the benefit of Taiwan application Serial No. 103114677, filed on Apr. 23, 2014, the subject matter of which is incorporated herein by reference.

BACKGROUND OF THE INVENTION

1. Field of the Invention

The invention relates in general to a touch device, and more particularly to an optical touch apparatus and an optical touch method.

2. Description of the Related Art

In a conventional optical touch system without reflective borders, an optical sensor is fixed on a touch panel. The optical sensor senses a light pen to output a sensing signal. The light pen reflects light that is emitted from a light emitting diode (LED) of the optical sensor. The conventional optical touch system determines whether the light pen contacts the touch panel according to a fixed threshold value. However, as the distance between the light pen and the optical sensor varies, the magnitude of the sensing signal also varies. If the fixed threshold value is too low, the calculation of touch point may be started too early when the light pen is near the optical sensor. Conversely, if the fixed threshold value is too high, the touch signal may not be detected when the light pen is far away from the sensor.

SUMMARY OF THE INVENTION

The invention is directed to an optical touch apparatus and an optical touch method.

According to one embodiment of the present invention, an optical touch apparatus is disclosed. The optical touch apparatus comprises a touch panel, a first optical sensor, a second optical sensor and a processor. The first optical sensor senses a light pen to output a first sensing signal. The second optical sensor senses the light pen to output a second sensing signal. The processor decides a threshold value according to the second sensing signal, and determines whether the first sensing signal is greater than the threshold value. If the first sensing signal is greater than the threshold value, the processor determines that the light pen contacts the touch panel.

According to another embodiment of the present invention, an optical touch method is disclosed. The optical touch method comprises sensing a light pen to output a first sensing signal by using a first optical sensor; sensing the light pen to output the second sensing signal by using a second optical sensor; deciding the threshold value according to the second sensing signal; determining whether the first sensing signal is greater than a threshold value; determining that the light pen contacts the touch panel if the first sensing signal is greater than the threshold value.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
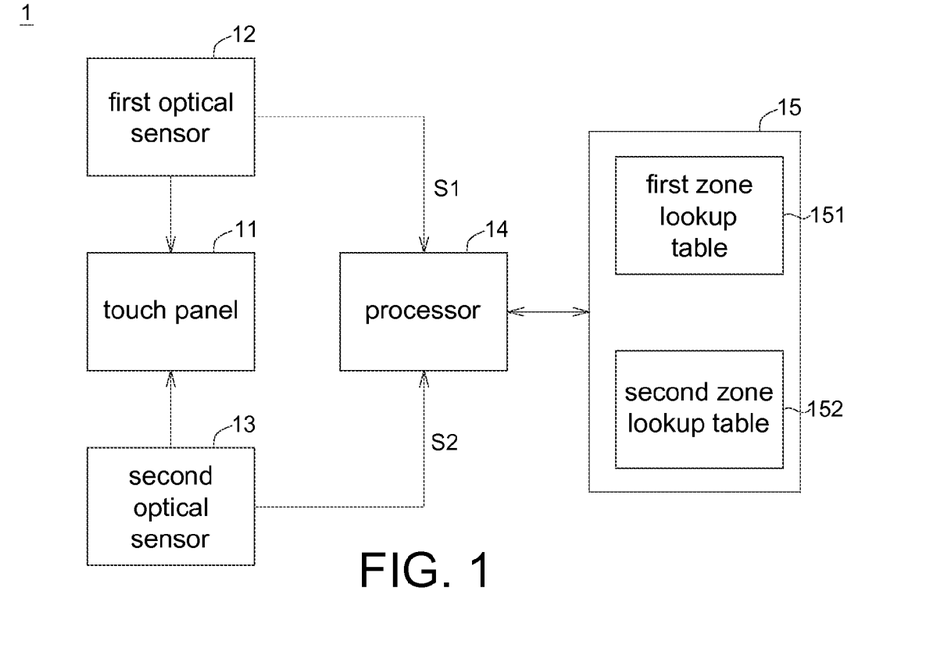
FIG. 1 is a block diagram of an optical touch apparatus according to a first embodiment.
Figure 2:
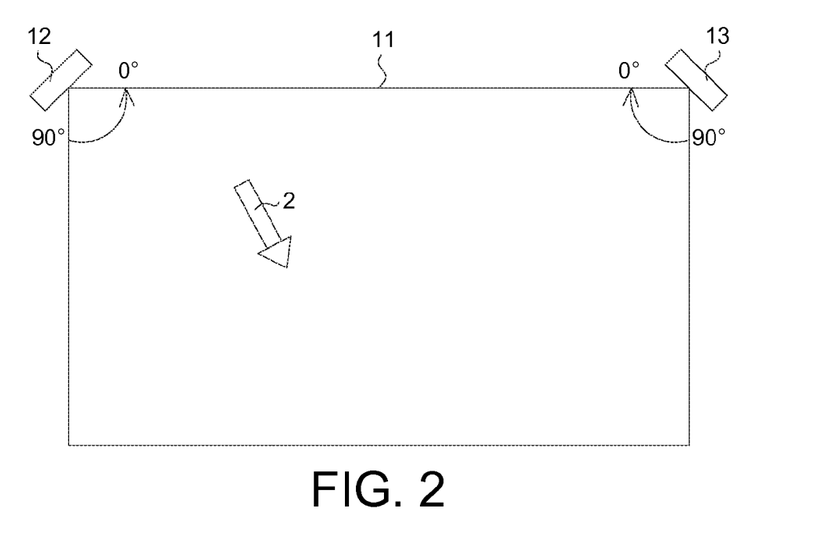
FIG. 2 is an appearance diagram of an optical touch apparatus and a light pen according to a first embodiment.
Figure 3:
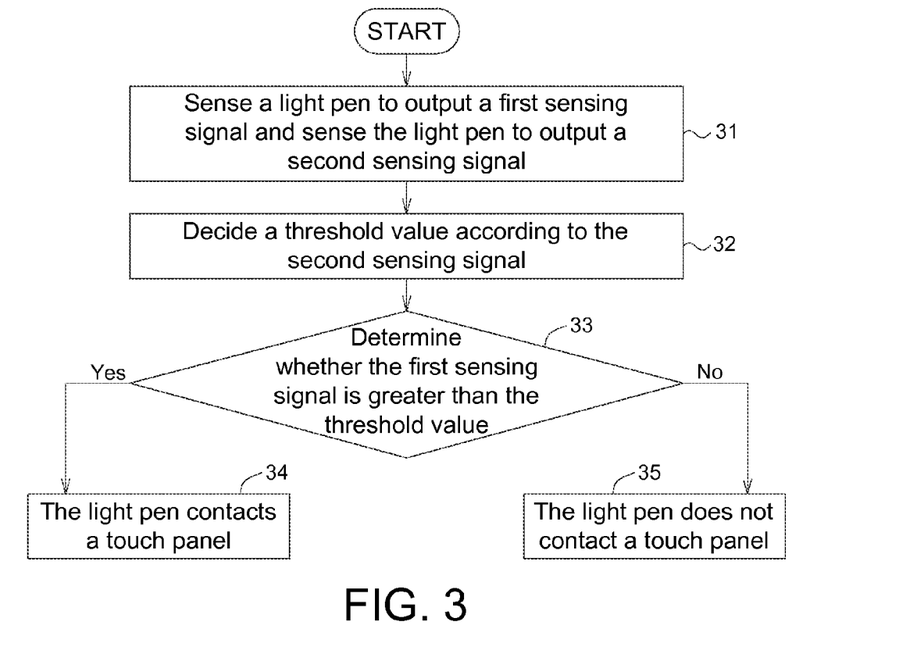
FIG. 3 is a flowchart of an optical touch method according to a first embodiment.

Refer to FIG. 1, FIG. 2 and FIG. 3. FIG. 1 is a block diagram of an optical touch apparatus according to a first embodiment. FIG. 2 is an appearance diagram of an optical touch apparatus and a light pen according to a first embodiment. FIG. 3 is a flowchart of an optical touch method according to a first embodiment. The optical touch apparatus 1 may be for example an electronic whiteboard, and the optical touch system 1 has no reflective border. The optical touch apparatus 1 includes a touch panel 11, a first optical sensor 12, a second optical sensor 13, a processor 14 and a storage device 15. The first optical sensor 12 may be disposed at the top left corner of the touch panel 11, and the second optical sensor 13 may be disposed at the top right corner of the touch panel 11, but the invention is not limited thereto. The first optical sensor 12 has a first sensing angle between 0°-90°, and the second optical sensor 13 has a second sensing angle between 0°-90°.

The optical touch method of the optical touch apparatus 1 includes the following steps: First, as indicated in step 31, the first optical sensor 12 senses a light pen 2 to output a first sensing signal S1, and the second optical sensor 13 senses the light pen 2 to output a second sensing signal S2. Next, as indicated in step 32, the processor 14 decides a threshold value according to the second sensing signal S2. Then, as indicated in step 33, the processor 14 determines whether the first sensing signal S1 is greater than the threshold value. If the first sensing signal S1 is greater than the threshold value, then the method proceeds to step 34. In step 34, the processor 14 determines that the light pen 2 contacts the touch panel 11. Conversely, if the first sensing signal S1 is not greater than the threshold value, then the method proceeds to step 35. In step 35, the processor 14 determines that the light pen 2 does not contact the touch panel 11. Furthermore, the storage device 15 stores the first zone lookup table 151 and the second zone lookup table 152. The first zone lookup table 151 may be for example a high-light zone lookup table, and the second zone lookup table 152 may be for example a low-light zone lookup table. The processor 14 selects the first zone lookup table 151 or the second zone lookup table 152 as a threshold lookup table according to the first sensing signal S1, and decides the threshold value according to threshold lookup table and the second sensing signal S2.

Figure 4:
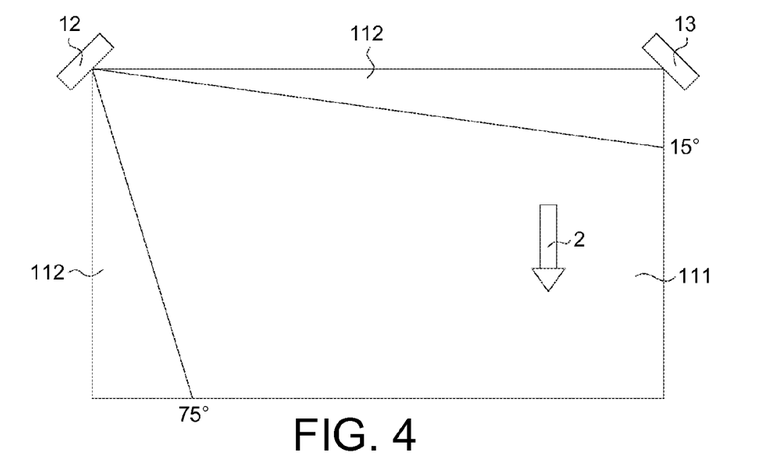
FIG. 4 is a schematic diagram of a touch panel divided into high-light zone and low-light zone.
Figure 5:
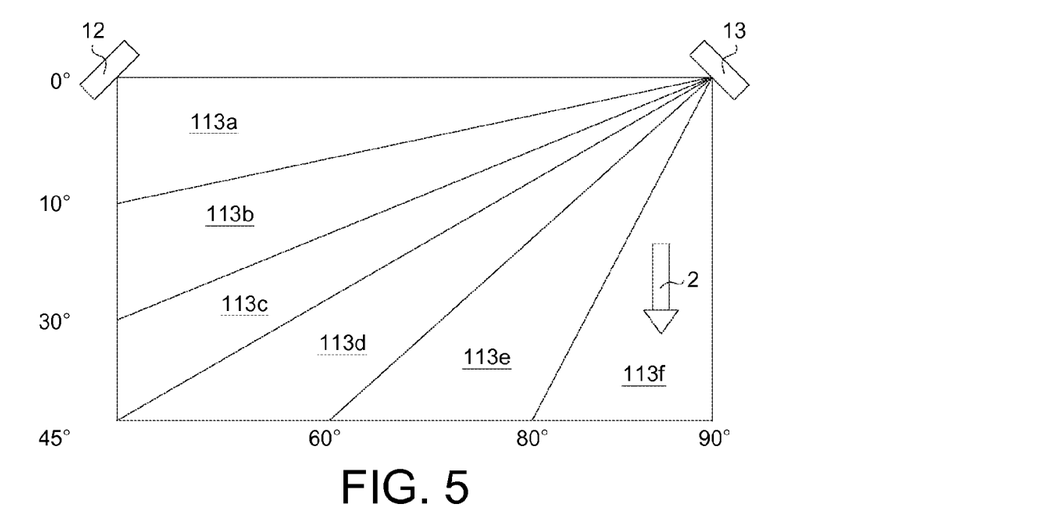
FIG. 5 is a schematic diagram of a touch panel divided into a plurality of zones according to the sensing angle of a second optical sensor.
Figure 6:
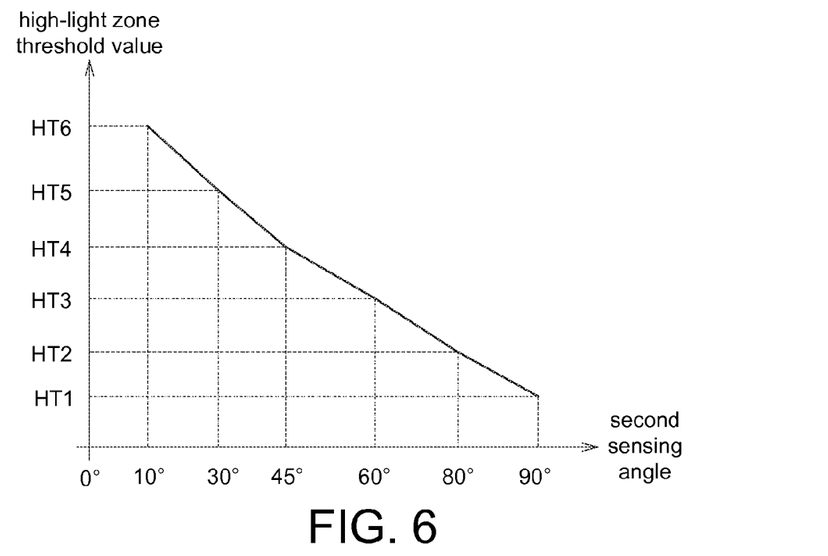
FIG. 6 is a relationship diagram of signal intensities vs sensing angles of the second optical sensor in the high-light zone.
Figure 7:
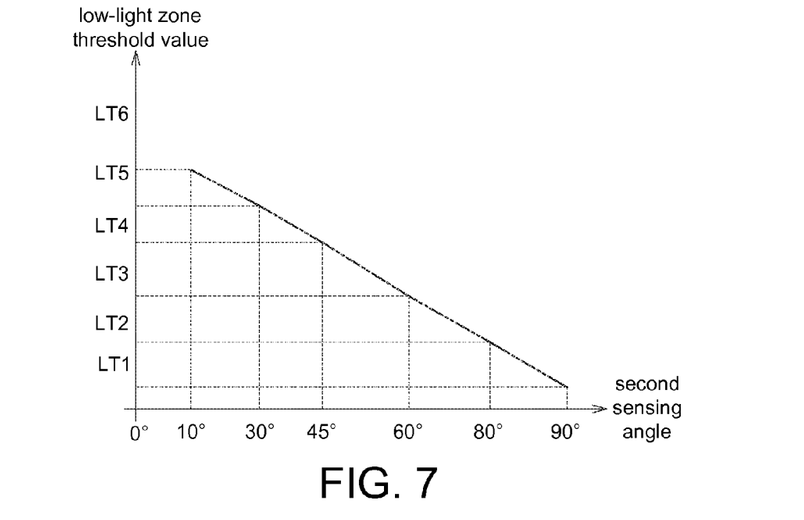
FIG. 7 is a relationship diagram of signal intensities vs sensing angles of the second optical sensor in the low-light zone.

Refer to FIG. 1, FIG. 4, FIG. 5, FIG. 6 and FIG. 7. FIG. 4 is a schematic diagram of a touch panel divided into high-light zone and low-light zone. FIG. 5 is a schematic diagram of a touch panel divided into a plurality of zones according to the sensing angle of a second optical sensor. FIG. 6 is a relationship diagram of signal intensities vs sensing angles of the second optical sensor in the high-light zone. FIG. 7 is a relationship diagram of signal intensities vs sensing angles of the second optical sensor in the low-light zone.

The touch panel 11 may further be divided into a high-light zone 111 and a low-light zone 112 according to the characteristics of the LED light source of the first optical sensor 12 (as indicated in FIG. 4). The reflective signal generated by the light pen 2 in the high-light zone 111 is greater than the reflective signal generated by the light pen 2 in the low-light zone 112. The first zone lookup table 151 and the second zone lookup table 152 correspond to the high-light zone 111 and the low-light zone 112 of FIG. 4, respectively. For example, the high-light zone 111 corresponds to the first sensing angle ranged between 15°-75° of the first optical sensor 12, and the low-light zone 112 correspond to the first sensing angle ranged between 0°-15° and the first sensing angle ranged between 75°-90° of the first optical sensor 12.

The smaller the sensing angle of the second optical sensor 13 is, the closer the light pen 2 is to the first optical sensor 12. Conversely, the larger the sensing angle of the second optical sensor 13 is, the farther away the light pen 2 is from the first optical sensor 12. The touch panel 11 may further be divided into threshold zones 113a to 113f according to the distance between the light pen 2 and the first optical sensor 12 (as indicated in FIG. 5). For example, the threshold zone 113a corresponds to the second sensing angle ranged between 0°-10°; the threshold zone 113b corresponds to the second sensing angle ranged between 10°-30°; the threshold zone 113c corresponds to the second sensing angle ranged between 30°-45°; the threshold zone 113d corresponds to the second sensing angle ranged between 45°-60°; the threshold zone 113e corresponds to the second sensing angle ranged between 60°-80°; the threshold zone 113f corresponds to the second sensing angle ranged between 80°-90°.

The first zone lookup table 151 includes high-light zone threshold values HT1-HT6 as indicated in FIG. 6, wherein the high-light zone threshold values HT1-HT6 correspond to threshold zones 113a-113f, respectively. The second zone lookup table 152 includes low-light zone threshold values LT1-LT6 as indicated in FIG. 7, wherein the low-light zone threshold values LT1-LT6 correspond to threshold zones 113a-113f, respectively. When the light pen 2 falls in the high-light zone 111, the processor 14 selects the first zone lookup table 151 as the threshold lookup table according to the first sensing signal S1, and further selects one of the high-light zone threshold values HT1-HT6 as the threshold value according to the second sensing signal S2. On the other hand, when the light pen 2 falls in the low-light zone 112, the processor 14 selects the second zone lookup table 152 as the threshold lookup table according to the first sensing signal S1, and further selects one of low-light zone threshold values LT1-LT6 as the threshold value according to the second sensing signal S2.

Figure 8:
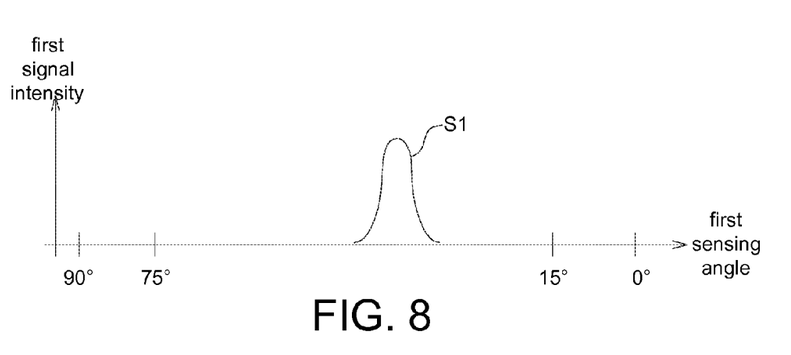
FIG. 8 is a diagram showing a first sensing signal.
Figure 9:
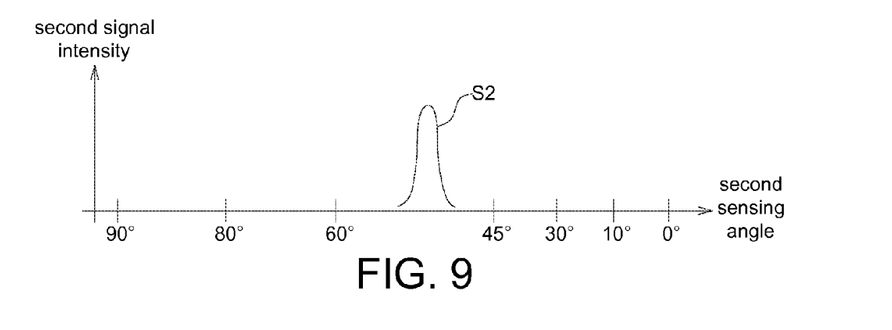
FIG. 9 is a diagram showing a second sensing signal.
Figure 10:
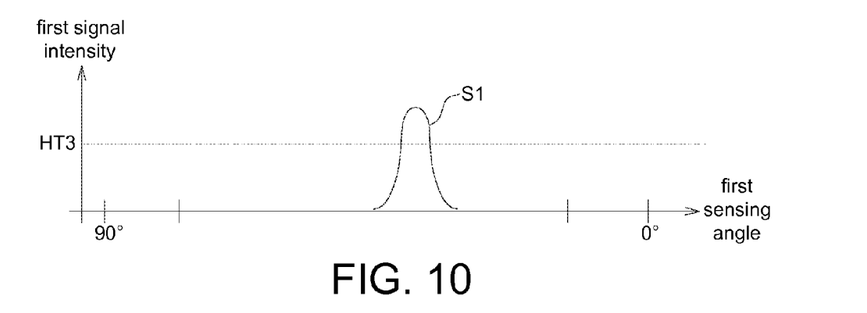
FIG. 10 is a diagram showing the first sensing signal greater than a threshold value.

Refer to FIG. 1, FIG. 4, FIG. 6, FIG. 8, FIG. 9 and FIG. 10. FIG. 8 is a diagram showing a first sensing signal. FIG. 9 is a diagram showing a second sensing signal. FIG. 10 is a diagram showing the first sensing signal greater than a threshold value. For example, the processor 14 determines whether the light pen 2 falls in the high-light zone 111 or the low-light zone 112 according to the first sensing signal S1. If the sensing location of the first sensing signal S1 is in the first sensing angle range between 15°-75°, this implies that the light pen 2 falls in the high-light zone 111. On the other hand, if (the sensing location of) the first sensing signal S1 is in the first sensing angle range between 0°-15° or is in the first sensing angle range between 75°-90°, this implies that the light pen 2 falls in the low-light zone 112.

If the sensing location of the first sensing signal S1 is in the first sensing angle range between 15°-75° as indicated in FIG. 8, the processor 14 selects the first zone lookup table 151 as the threshold lookup table according to the sensing location of the first sensing signal S1. If (the sensing location of) the second sensing signal S2 is in the second sensing angle range between 45°-60° as indicated in FIG. 9, the processor 14 selects the high-light zone threshold value HT3 from the first zone lookup table 151 as the threshold value. Then, the processor 14 determines whether the first sensing signal S1 is greater than high-light zone threshold value HT3 or not. If the first sensing signal S1 is greater than the high-light zone threshold value HT3 as indicated in FIG. 10, the processor 14 determines that the light pen 2 contacts the touch panel 11.

Second Embodiment

Figure 11:
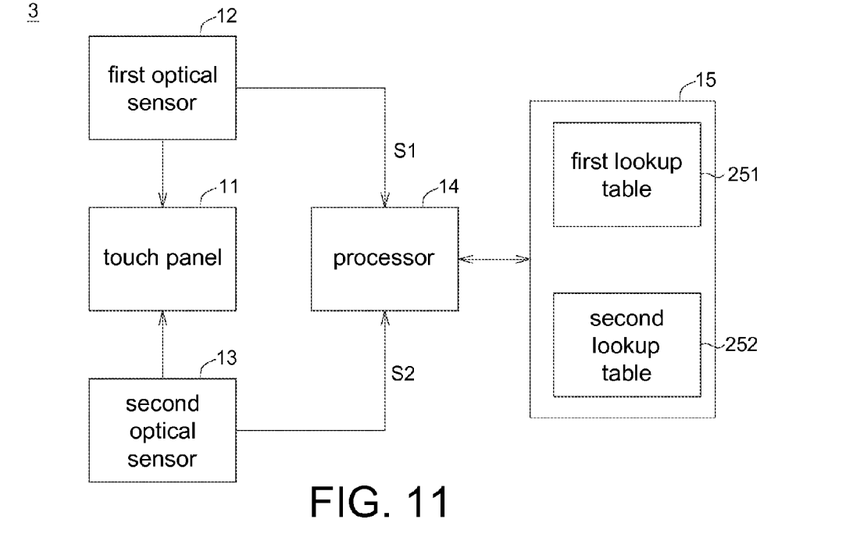
FIG. 11 is a block diagram of an optical touch apparatus according to a second embodiment.

Referring to FIG. 11, a block diagram of an optical touch apparatus according to a second embodiment is shown. The main difference between the first embodiment and the second embodiment is in that the storage device 15 of the optical touch apparatus 3 stores a first lookup table 251 and a second lookup table 252. The processor 14 decides a height ratio according to the second sensing signal S2 and the second lookup table 252, and further decides the threshold value according to height ratio, the first sensing signal S1 and the first lookup table 251.

Figure 12:
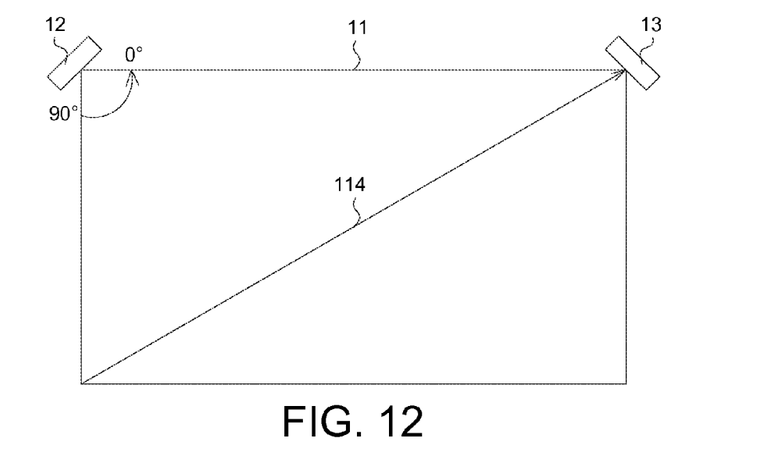
FIG. 12 is a schematic diagram of a first diagonal and a first sensing angle.
Figure 13:
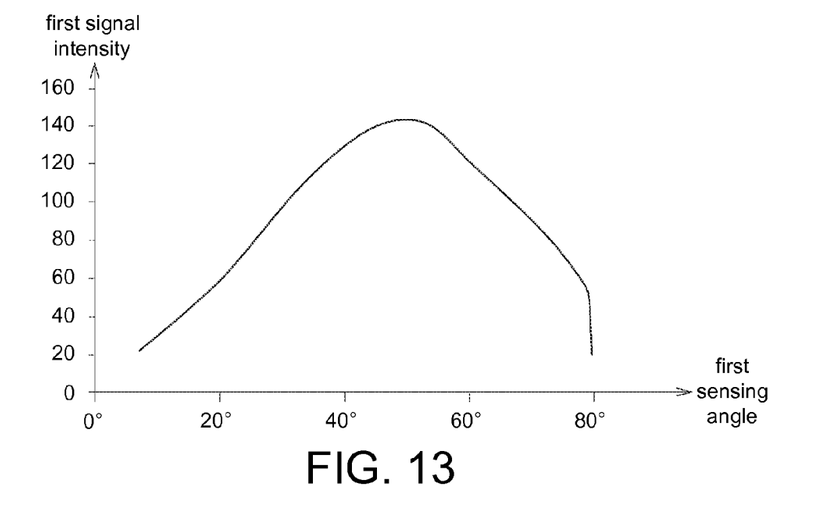
FIG. 13 is a schematic diagram of first signal intensities on a first diagonal.

Refer to FIG. 11, FIG. 12 and FIG. 13. FIG. 12 is a schematic diagram of a first diagonal and a first sensing angle. FIG. 13 is a schematic diagram of first signal intensities on a first diagonal. The first optical sensor 12 has a first sensing angle between 0°-90°, and the touch panel 11 has a first diagonal 114. The first diagonal 114 is opposite to the first optical sensor 12. The first diagonal 114 that goes from the bottom left corner to the top right corner corresponds to 90°-0° of the first sensing angle. The first signal intensities on the first diagonal 114 are indicated in FIG. 13. The first lookup table 251 includes multiple first signal intensities as indicated in FIG. 13. The first signal intensities in the first lookup table 251 correspond to the first sensing angles, respectively. In the second embodiment, the first lookup table 251 is created according to the first diagonal 114. However, the invention is not limited thereto in practical applications. In some embodiments, the first lookup table 251 may also be created according to a first arc stretching from the bottom left corner to top right.

Figure 14:
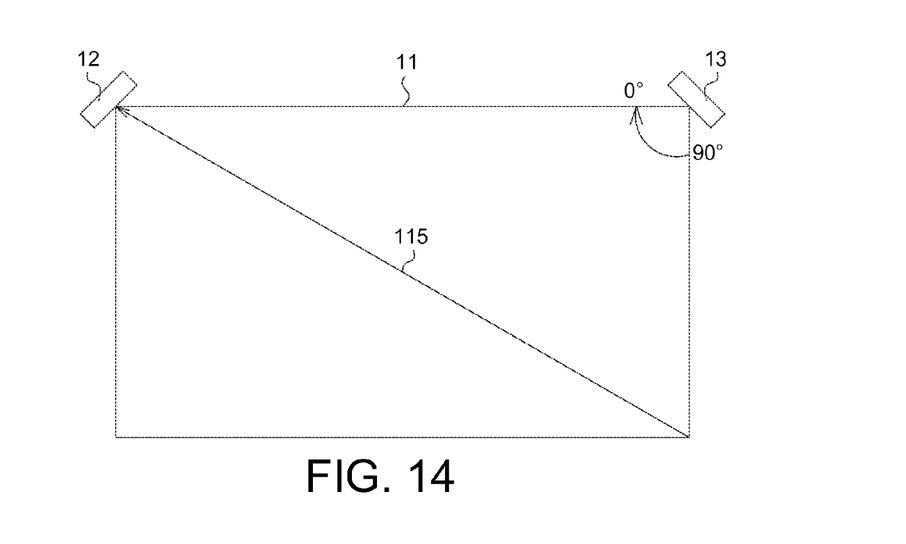
FIG. 14 is a schematic diagram of a second diagonal and a second sensing angle.
Figure 15:
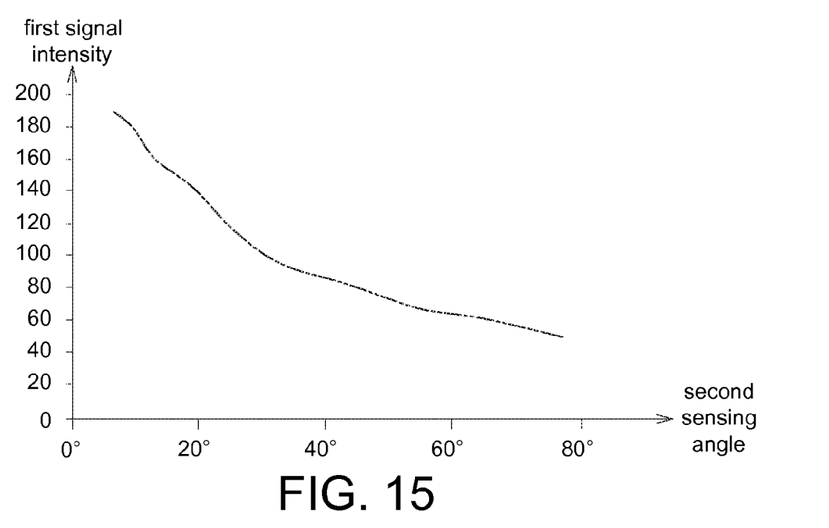
FIG. 15 is a schematic diagram of first signal intensities on a second diagonal.

Refer to FIG. 11, FIG. 14 and FIG. 15. FIG. 14 is a schematic diagram of a second diagonal and a second sensing angle. FIG. 15 is a schematic diagram of first signal intensities on a second diagonal. The second optical sensor 13 has a second sensing angle between 0°-90°, and the touch panel 11 has a second diagonal 115. The second diagonal 115 is opposite to the second optical sensor 13. The second diagonal 115 that goes from the bottom right corner to the top left corner corresponds to 90°-0° of the second sensing angle. The first signal intensities on the second diagonal 115 are as indicated in FIG. 15. The second lookup table 252 includes multiple first signal intensities as indicated in FIG. 15. The first signal intensities in the second lookup table 252 correspond to the second sensing angles, respectively. In the second embodiment, the second lookup table 252 is created according to the second diagonal 115. However, the invention is not limited thereto in practical applications. In some embodiments, the second lookup table 252 may also be created according to a second arc stretching from the bottom right corner to top left.

Figure 16:
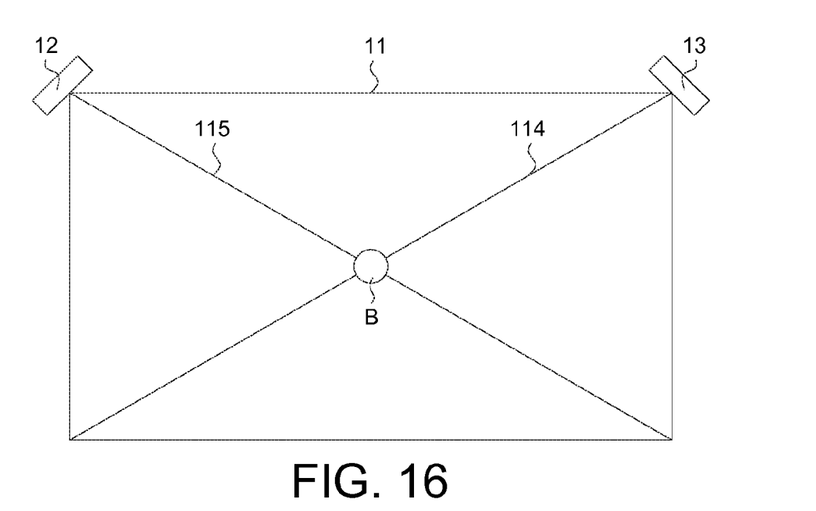
FIG. 16 is a schematic diagram of a first diagonal and a second diagonal intersecting at a base point.
Figure 17:
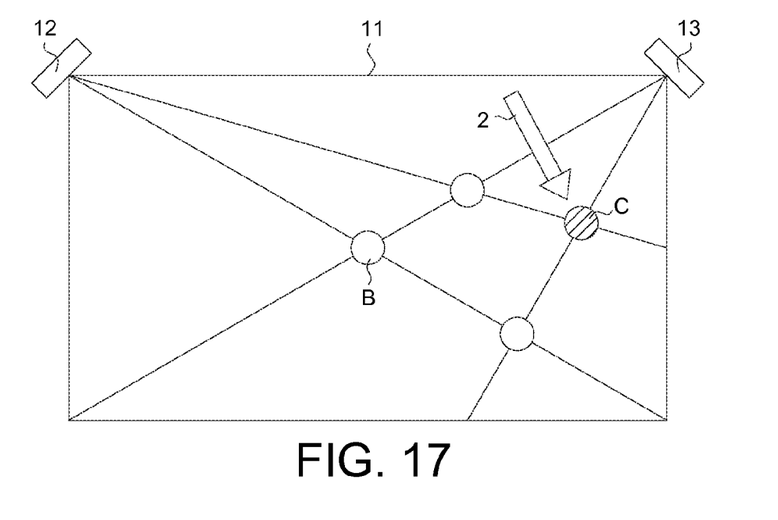
FIG. 17 is a schematic diagram of a base point and several sensing locations at which the first sensing signal or the second sensing signal changes.

Refer to FIG. 16 and FIG. 17. FIG. 16 is a schematic diagram of a first diagonal and a second diagonal intersecting at a base point. FIG. 17 is a schematic diagram of a base point and several sensing locations at which the first sensing signal or the second sensing signal changes. The first diagonal 114 and the second diagonal 115 intersect at a base point B. When the light pen 2 gets close to the sensing location C, the first sensing signal S1 and the second sensing signal S2 will change at the sensing location C.

Figure 18:
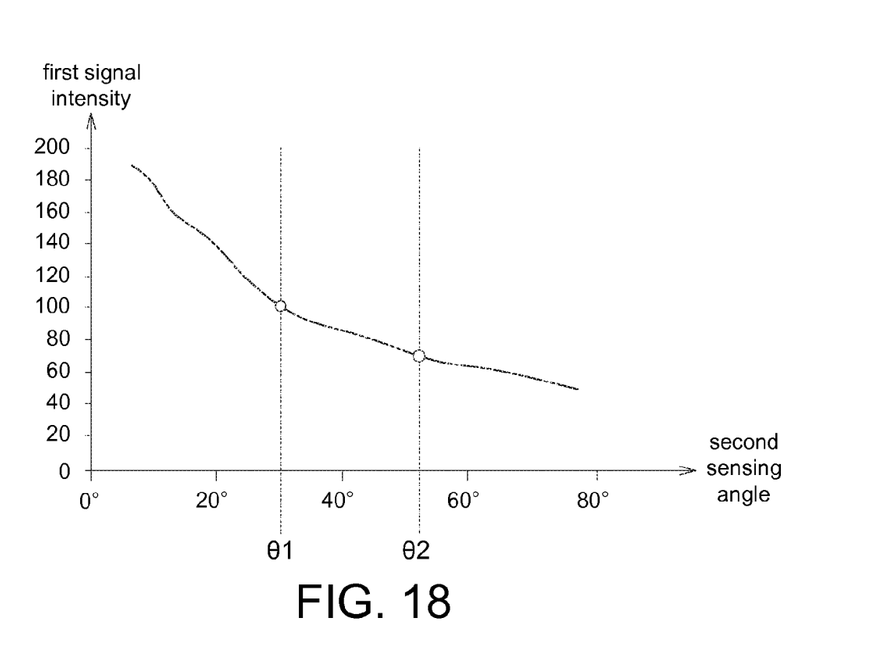
FIG. 18 is a schematic diagram of first signal intensities corresponding to the base point and the sensing locations.
Figure 19:
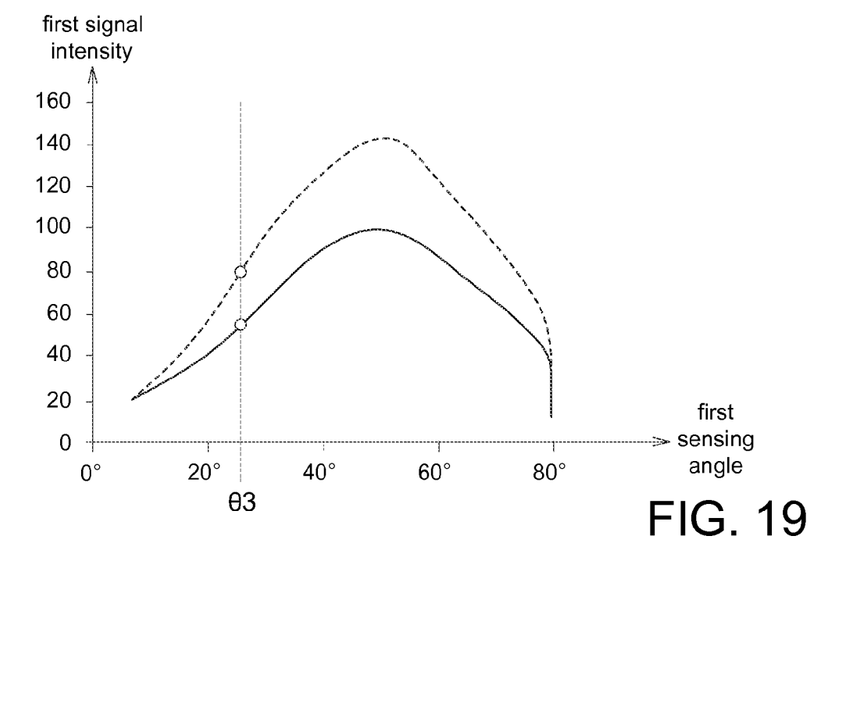
FIG. 19 is a schematic diagram of the first signal intensities of FIG. 13 multiplied by a ratio.

Refer to FIG. 17, FIG. 18 and FIG. 19. FIG. 18 is a schematic diagram of first signal intensities corresponding to the base point and the sensing locations. FIG. 19 is a schematic diagram of the first signal intensities of FIG. 13 multiplied by a ratio. The processor 14 selects one of the first signal intensities as a base point signal intensity according to the base point B, and selects one of the first signal intensities as a second candidate signal intensity according to the second sensing signal S2. The processor 14 decides the ratio according to the base point signal intensity and the second candidate signal intensity. For example, in FIG. 18, θ1 is the second sensing angle corresponding to the base point B, and θ2 is the second sensing angle corresponding to the sensing location C. The processor 14 selects the first signal intensity 100 as the base point signal intensity according to the second sensing angles θ1, and selects the first signal intensity 70 as the second candidate signal intensity according to the second sensing angles θ2.

The processor 14 calculates the height ratio of the second candidate signal intensity to the base point signal intensity as 0.7. The first signal intensity of FIG. 13 is multiplied by 0.7 and is shown in FIG. 19. In FIG. 19, θ3 is the first sensing angle corresponding to the sensing location C. The processor 14 selects the first signal intensity 80 as the first candidate signal intensity according to the first sensing signal S1, and multiplies the first candidate signal intensity by the height ratio and a predetermined ratio to obtain the threshold value. The predetermined ratio may be for example 0.75. Therefore, the threshold value corresponding to the sensing location C is: 80×0.7×0.75=42.

Third Embodiment

As described above, the threshold value varies depending on the location of the light pen 2. For example, in the first embodiment, the touch panel 11 is divided into a high-light zone 111 and a low-light zone 112, and there are a first zone lookup table 151 and a second zone lookup table 152 storing different threshold values according to the distance between the light pen 2 and the first optical sensor 12 (please refer to FIG. 4 FIG. 7). In the second embodiment, based on the location of the light pen 2 relative to the first diagonal 114 and the second diagonal 115, the threshold value can be determined accordingly (please refer to FIG. 12 FIG. 19). Generally speaking, the threshold value is higher when the light pen 2 is closer to the first optical sensor 12.

The embodiments disclosed above assume that the light pen 2 is always the same. In reality, however, the light pen may be different because each user may use his personal light pen. Due to the inevitable process variations, different light pens may have different light reflection coefficients. Even if at the exact same location on the touch panel 11, different light pens may result in different signal intensities received at the first optical sensor 12. Therefore, the threshold value has to be adjusted according to the characteristics of each light pen, in particular the light reflection coefficient of each light pen.

Figure 20:
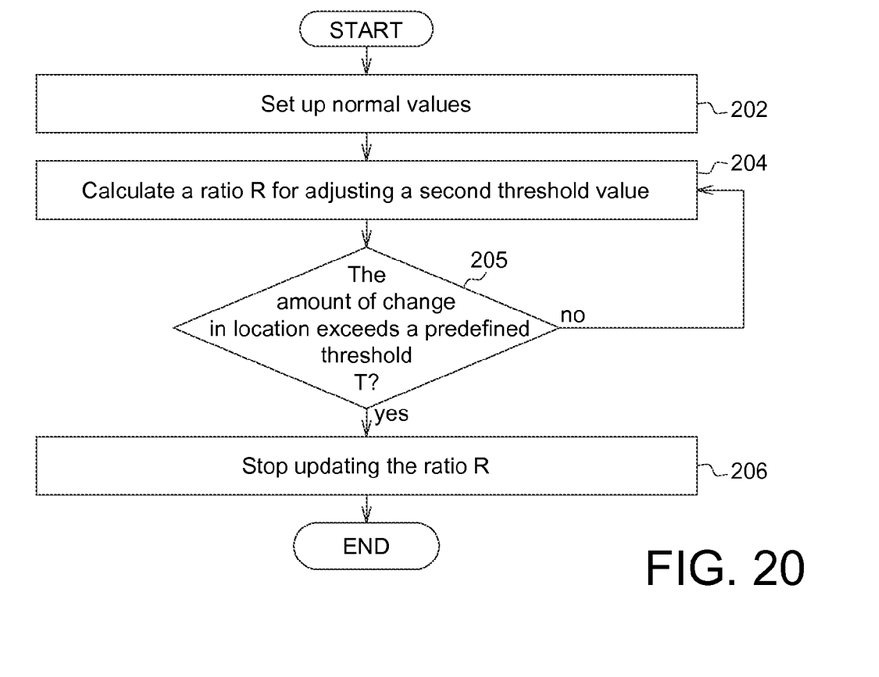
FIG. 20 is a flowchart of an optical touch method according to a third embodiment.

Refer to FIG. 20. FIG. 20 is a flowchart of an optical touch method according to a third embodiment. The optical touch method adapted for different light pens includes the following steps: First, normal values are set up for a light pen 2 in step 202. Next, when the light pen 2 is replaced by a second light pen, a ratio R is dynamically calculated for adjusting a second threshold value for the second light pen in step 204. The ratio R represents a ratio between the second threshold value and the normal threshold value, and the ratio R is related to the light reflection coefficient of the light pen 2 and the second light pen. Then, in step 206, stop updating the ratio R when a certain condition is met. The method disclosed herein may be performed by the processor 14. The detailed description of each step is given below.

In step 202, a light pen 2 is used as a "normal" light pen to set up normal values for the touch panel 11. The normal values include three values: a light intensity value, a threshold value and a noise value.

To measure the light intensity value at every location on the touch panel 11, ideally the light pen 2 has to touch every location in order to record the most accurate light intensity value for every location on the touch panel 11. The threshold value is then set as a particular ratio of the light intensity value. For example, the threshold value may be set as 75% of the light intensity value for every location on the touch panel 11.

Alternatively, the threshold value of every location on the touch panel 11 may be set up as presented in the previous two embodiments since practically using the light pen 2 to touch every location is too time-consuming and requires a huge volume of data to be stored. The threshold value is used for determining whether the light pen 2 contacts the touch panel 22. The light pen 2 is determined to be contacting the touch panel 11 if the first sensing signal S1 is greater than the threshold value at that location.

The noise value is set as a fixed value in this embodiment. Specifically, the noise value does not vary with the location of the light pen 2, and even if the light pen 2 is replaced by another light pen, the noise value remains the same. If the signal intensity of the first sensing signal S1 is smaller than the noise value, the sensed signal is regarded as a noise and thus is filtered out. On the contrary, if the signal intensity of the first sensing signal S1 is greater than the noise value, the signal is regarded as being generated by the light pen 2.

After performing step 202, the normal values at every location has been set up appropriately, wherein the normal values include the light intensity value, the threshold value, and the noise value. When a second light pen is used, and when a new first sensing signal S1' for the second light pen is greater than the noise value, the second threshold value is calculated in step 204. The calculation is based on a ratio R between the new light intensity of the second light pen and the normal light intensity value.

For example, when the second light pen touches a location X on the touch panel 11, the new light intensity sensed from the second light pen is 80. Suppose the normal light intensity value at location X is 100, and thus the ratio R between the new light intensity and the normal light intensity value is 0.8. The second threshold value for the second light pen is set as the normal threshold value multiplied by 0.8. The difference between the light intensity of two different light pens results from the different light reflection coefficients.

It should be noted that the step 204 is started when the sensed signal is greater than the noise value. Once the calculation for the ratio R starts, the calculation is performed continuously to keep updating the ratio R until the amount of change in location of the second light pen exceeds a predefined threshold T (step 205). For example, if the second light pen stays on the touch panel 11 for 5 seconds, and the signal sampling rate is 60 Hz, the ratio R will be updated for 300 times. If the second light pen starts moving on the touch panel 11, and the amount of change in location exceeds the predefined threshold T, such as 5 pixels, the update procedure of the ratio R stops and the ratio R remains as the latest updated value (step 206). The second threshold value will be adjusted according to the latest updated ratio R thereafter. Suppose the latest updated ratio R is 1.2, the second threshold value will be the normal threshold value multiplied by 1.2, wherein the normal threshold value may be obtained as disclosed in the previous two embodiments.

The optical touch apparatus disclosed in above embodiments dynamically decides a threshold value according to the second sensing signal, and further determines whether the first sensing signal is greater than the threshold value. As compared to the conventional method in which whether the light pen contacts the touch panel is determined by one single threshold value, the embodiments of the invention reduce the likelihood of misjudging the touch points on the touch panel.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical touch apparatus, comprising:
   a touch panel;
   a first optical sensor for sensing a first light pen to output a first sensing signal;
   a second optical sensor for sensing the first light pen to output a second sensing signal; and
   a processor for deciding a first threshold value according to the second Sensing signal, determining whether the first sensing signal is greater than the first threshold value, and determining that the first light pen contacts the touch panel in response to the first sensing signal being greater than the first threshold value,
   wherein when the first light pen is replaced by a second light pen, the processor adjusts a second threshold value for the second light pen according to the first threshold value and a ratio between a light reflection coefficient of the first light pen and a light reflection coefficient of the second light pen.

2. The optical touch system according to claim 1, further comprising:
   a storage device for storing a first zone lookup table and a second zone lookup table, wherein the first zone lookup table and the second zone lookup table correspond to a plurality of first sensing angle ranges of the first optical sensor, respectively, and the processor selects the first zone lookup table or the second zone lookup table as a threshold lookup table according to the first sensing signal and decides the first threshold value according to the threshold lookup table and the second sensing signal.

3. The optical touch system according to claim 2, wherein the first zone lookup table comprises a plurality of high-light zone threshold values corresponding to a plurality of second sensing angle ranges of the second optical sensor, respectively, and the second zone lookup table comprises a plurality of low-light zone threshold values corresponding to the second sensing angle ranges of the second optical sensor, respectively.

4. The optical touch system according to claim 3, wherein when the processor selects the first zone lookup table as the threshold lookup table, the processor selects one of the high-light zone threshold values as the first threshold value according to the second sensing signal.

5. The optical touch system according to claim 3, wherein when the processor selects the second zone lookup table as the threshold lookup table, the processor selects one of the low-light zone threshold values as the first threshold value according to the second sensing signal.

6. The optical touch system according to claim 1, further comprising:
   a storage device for storing a first lookup table and a second lookup table;
   wherein the processor decides a height ratio according to the second sensing signal and the second lookup table, and decides the first threshold value according to the height ratio, the first sensing signal and the first lookup table.

7. The optical touch system according to claim 6, wherein a first diagonal is defined as a line extending out from the first optical sensor to a corner of the touch panel opposite the first optical sensor, and a second diagonal is defined as a line extending out from the second optical sensor to a corner of the display opposite the second optical sensor, the first diagonal and the second diagonal intersect at a base point, the first lookup table comprises a plurality of first signal intensities on the first diagonal, the first signal intensities in the first lookup table correspond to a plurality of first sensing angles of the first optical sensor, respectively, the second lookup table comprises the first signal intensities on the second diagonal, and the first signal intensities in the second lookup table correspond to a plurality of second sensing angles of the second optical sensor, respectively.

8. The optical touch system according to claim 7, wherein the processor selects one of the first signal intensities as a base point signal intensity according to the base point and selects one of the first signal intensities as a second candidate signal intensity according to the second sensing signal, and the processor decides the height ratio according to the base point signal intensity and the second candidate signal intensity.

9. The optical touch system according to claim 8, wherein the processor selects one of the first signal intensities as a first candidate signal intensity according to the first sensing signal and multiplies the first candidate signal intensity by the height ratio and a predetermined ratio to obtain the first threshold value.

10. An optical touch method, comprising:
 sensing a first light pen to output a first sensing signal by a first optical sensor;
 sensing the first light pen to output a second sensing signal by a second optical sensor;
 deciding a first threshold value according to the second sensing signal;
 determining whether the first sensing signal is greater than the first threshold value; and
 determining that the first light pen contacts a touch panel in response to the first sensing signal being greater than the first threshold value,
 wherein when the first light pen is replaced by a second light pen, the processor adjusts a second threshold value for the second light pen according to the first threshold value and a ratio between a light reflection coefficient of the first light pen and a light reflection coefficient of the second light pen.

11. The optical touch method according to claim 10, further comprising:
 storing a first zone lookup table and a second zone lookup table in a storage device, wherein the first zone lookup table and the second zone lookup table correspond to a plurality of first sensing angle ranges of the first optical sensor, respectively;
 wherein, in the step of deciding the first threshold value, the first zone lookup table or the second zone lookup table is selected as a threshold lookup table according to the first sensing signal, and the first threshold values is decided according to the threshold lookup table and the second sensing signal.

12. The optical touch method according to claim 11, wherein the first zone lookup table comprises a plurality of high-light zone threshold values corresponding to a plurality of second sensing angle ranges of the second optical sensor, respectively, and the second zone lookup table comprises a plurality of low-light zone threshold values corresponding to the second sensing angle ranges of the second optical sensor, respectively.

13. The optical touch method according to claim 12, wherein when the first zone lookup table is selected as the threshold lookup table, one of the high-light zone threshold values is selected as the first threshold values according to the second sensing signal.

14. The optical touch method according to claim 12, wherein when the second zone lookup table is selected as the threshold lookup table, one of the low-light zone threshold values is selected as the first threshold value according to the second sensing signal.

15. The optical touch method according to claim 10, further comprising:
 storing a first lookup table and a second lookup table in a storage device;
 wherein, a height ratio is decided according to the second sensing signal and the second lookup table, and the first threshold value is decided according to the height ratio, the first sensing signal and the first lookup table.

16. The optical touch method according to claim 15, wherein a first diagonal is defined as a line extending out from the first optical sensor to a corner of the touch panel opposite the first optical sensor, and a second diagonal is defined as a line extending out from the second optical sensor to a corner of the display opposite the second optical sensor, the first diagonal and the second diagonal intersect at a base point, the first lookup table comprises a plurality of first signal intensities on the first diagonal, the first signal intensities in the first lookup table correspond to a plurality of first sensing angles of the first optical sensor, respectively, the second lookup table comprises the first signal intensities on the second diagonal, and the first signal intensities in the second lookup table correspond to a plurality of second sensing angles of the second optical sensor, respectively.

17. The optical touch method according to claim 16, wherein one of the first signal intensities is selected as a base point signal intensity according to the base point, one of the first signal intensities is selected as a second candidate signal intensity according to the second sensing signal, and the height ratio is decided according to the base point signal intensity and the second candidate signal intensity.

18. The optical touch method according to claim 17, wherein one of the first signal intensities is selected as a first candidate signal intensity according to the first sensing signal, and the first candidate signal intensity is multiplied by the height ratio and by a predetermined ratio to obtain the first threshold value.

19. The optical touch method according to claim 10, wherein the second threshold value is the first threshold value multiplied by a ratio of the light coefficient of the second light pen to the light coefficient of the first light pen.

* * * * *